United States Patent Office 2,815,387
Patented Dec. 3, 1957

2,815,387

PRODUCTION OF ORGANIC OXYGEN CONTAINING COMPOUNDS

Arthur William Charles Taylor, Norton-on-Tees, England, assignor to Imperial Chemical Industries Limited, a corporation of Great Britain No Drawing. Application June 1, 1953, Serial No. 358,947

Claims priority, application Great Britain June 20, 1952

1 Claim. (Cl. 260—604)

This invention relates to the production of organic oxygen-containing compounds.

It is known in the production of such compounds to form in a first or generating stage an active carbonylating catalyst by reacting a catalytic metal, such as cobalt, with carbon monoxide and hydrogen at superatmospheric pressure and elevated temperature in the presence of a liquid which may be an olefinic compound, such as an alkene, or an inert medium and thereafter to use the so formed catalyst for the carbonylation of olefinic compounds with carbon monoxide and hydrogen under superatmospheric pressure and at elevated temperature in a second stage. Subsequently the carbonylation product is treated with hydrogen in order to expel carbon monoxide and precipitate catalytic metal, such as cobalt, therefrom, and the precipitated metal is removed from the liquid e. g. by deposition on an inert support, or filtration, or magnetic separation when the metal is ferromagnetic, e. g. cobalt. The so separated metal is then used in the aforementioned generation stage for preparation of the active carbonylation catalyst.

In this process control of the cobalt concentration in the carbonylation stage is very important since low concentrations of cobalt give low conversions of olefine, and high concentrations assist formation of undesirable by-products, especially at high temperatures.

When the olefine is gaseous under the generation conditions it is most frequently arranged to have an inert medium such as an alcohol, or a higher alkene, e. g. one with eight carbon atoms, present in the generation stage. The invention is of greatest benefit when olefines are fed to the generation stage, since they tend to react with carbon monoxide and hydrogen there.

According to the present invention in a process of carbonylation of the sort described the generation stage is conducted in the presence of olefinic feed or an inert liquid medium and within a temperature range favourable to the formation of the active carbonylation catalyst and control of the rate of generation of active catalyst from the metal and the rate of feeding the active catalyst to the carbonylation stage is exercised by adjusting the molar ratio $H_2:CO$ of the gas employed in the generation stage.

It is preferred to employ in the generating stage carbon monoxide or carbon monoxide and hydrogen substantially free from nitrogen or other diluent since the gas can be directly employed for carbonylation. The preferred catalytic metal is cobalt and in this case the temperature range in the generation stage is from 50° to 160° C., and preferably 120° to 140° C. The invention will now be illustrated with reference to the use of cobalt as catalyst.

If it is desired to operate the generation stage and the carbonylation stage at a low concentration of cobalt e. g., up to about 1.5%, then the rate of generation of the solution of cobalt compound is slowed down and this can be accomplished by increasing the proportion of hydrogen in the generating gas. Besides keeping the concentration of cobalt low this adjustment reduces the rate of heat evolution and therefore affords good control of temperature, which preferably should be kept within the range 120° to 140° C. Below 120° C. rate of generation falls off, and above 140° C. the equilibrium becomes increasingly less favourable to the formation of cobalt carbonyls.

It is desired to work within the range 120° C. to 140° C. rather than to lower the temperature, because it is closer to the temperature at which separation of cobalt from the carbonylation product takes place and therefore when the same vessel is used alternately for generation and separation there is a minimum waste of time and of heat energy in altering the temperature of the vessel. Also the issuing solution of cobalt carbonyl from the generating stage is at a temperature close to that required in the carbonylation stage. Since generation is most active between 120° and 140° C. excessive formation of cobalt carbonyl and hydrocarbonyl is most likely to occur within that range, leading to danger of deposition of these compounds in the cooler parts of the equipment and consequent choking, as well as variation in the cobalt concentration of the liquid fed to the carbonylation stage. There is also the secondary advantage that by controlling heat evolution in this way, capital costs are reduced by elimination of the need for heat exchangers.

Further, if the heat evolution in the generator is too high the rate of generation of the cobalt carbonyls will rise steeply at first and then fall off due to their instability at higher temperatures; the rate of other exothermic reactions such as disproportionation of CO to carbon and $CO_2$, will become significant at the increased temperature and therefore temperatures, and consequently pressures, injurious to the equipment will develop; and in the case where olefine feed is also present carbonylation, and probably hydrogenation, of olefine will take place in the generator.

In operating according to the invention suitable conditions in the generator are: a total pressure of 70 to 300 atmospheres, preferably at least 100; and a partial pressure of CO of more than 30 atmospheres, preferably more than 50 atmospheres.

Most frequently when operating according to the invention the percentage of hydrogen in the gas employed in the generator will be varied between 10 and 30% by volume, because this affords optimum control.

The process of the invention applies with especial benefit when olefine is present in the generator; or when the space velocity in the generator is low, say below 25 litres/kilogram of cobalt/hour, for then the need for control is more critical.

While broad control can be most frequently exercised in the manner described, there is another important factor, which must be taken into account, viz. the gas:liquid volume ratio. When olefinic materials is present in the generator it is preferred to keep this as low as possible, compatibly with other requirements, in order to prevent reactions such as carbonylation and hydrogenation taking place to an appreciable extent. For this reason it is desirable that the gas:liquid volume ratio should not exceed 100:1 (gas measured at 20° C. and 1 atmosphere).

The invention is illustrated by the following examples.

*Example 1*

The generator comprised a vessel containing 15 kilograms of metallic cobalt distributed throughout its volume on a pumice support. Di-isobutene at 110° C. was passed into the generator at a rate of 13.3 litres per kilogram of cobalt per hour. A generating gas consisting of 25% hydrogen and 75% CO at 110° C. and under 250 atmospheres total pressure was passed through the generator at a gas:liquid volume ratio of 40:1 (measured at 20° C. and 1 atmospheric pressure) and in this way the initial concentration of cobalt in the resulting solution was kept to not more than 1.0% by weight; the hydrogen rate was small enough to limit the conversion of di-isobutene to nonaldehyde and iso-octane to about 3%; the total heat evolution was such that the exit temperature was 140° C.; and the solution of cobalt in the di-isobutene proceeded smoothly. It had not been possible to attain these conditions of operation, using CO alone as generating gas.

In the process operating smoothly as described the hydrogen addition was stopped. Within a short time the generator temperature and the concentration of cobalt in solution rose sharply and choking of the liquid exit line from the generator soon occurred through deposition of cobalt carbonyl compounds.

Again, in the same process operating smoothly as described in the first paragraph the $H_2:CO$ ratio was altered to 60:40. Temperature soon rose again as a result of the occurrence of increasing carbonylation and hydrogenation, and disproportionation of CO aggravated the run-away. Ultimately the temperature reached 250° C., and the process had to be shut down.

Exactly similar results to those described in this paragraph have been obtained when the cobalt to be converted into carbonyl was separated onto magnets.

Example 2

The generator comprised a vessel containing 12 kilograms of metallic cobalt distributed throughout its volume on a vertical string of permanent magnets. A high boiling inert oxygenated liquid, essentially high boiling oxygenated compounds obtained in the carbonylation of di-isobutene, preheated to 120° C. was passed into the generator at a rate of 22 litres per kg. of cobalt per hour. A generating gas consisting of 12% $H_2$ and 88% CO at 120° C. and under 250 atmospheres total pressure was passed through the generator in a gas:liquid volume ratio of 200:1 (measured at 20° C. and 1 atmosphere pressure) and in this way the initial concentration of cobalt in the resulting solution was kept to at most 1.5% by weight, the total heat evolution being such that the exit temperature was 145° C. Under these conditions the solution of cobalt in the di-isobutene proceeded smoothly. In the absence of hydrogen it was necessary to almost double the liquid rate in order to control the initial temperature, and even then smooth operation which results from a fairly steady concentration of cobalt in the solution leaving the generator was not obtained, since this concentration fell fairly rapidly.

I claim:

In a process for the production of oxygen-containing organic compounds wherein (a) an olefinic material is reacted with carbon monoxide and hydrogen at elevated temperature and pressure in the presence of a dissolved cobalt carbonyl compound as catalyst, (b) cobalt dissolved in the resulting product is precipitated therefrom by treatment with hydrogen at elevated temperature and pressure onto a supporting element, (c) the precipitated cobalt is generated while disposed on the said element into active catalytic form as the cobalt carbonyl compound by treatment with carbon monoxide and hydrogen in the presence of a solvent selected from the group consisting of olefines and inert solvents under elevated temperature and pressure and (d) the cobalt carbonyl compound thus obtained is used for said carbonylation and reaction between the olefinic material, carbon monoxide and hydrogen, the improvements in generating said catalyst comprising (1) conducting the generation at a temperature between 120°–140° C., under a total pressure of 100 to 300 atmospheres and a partial carbon monoxide pressure of at least 30 atmospheres, (2) obtaining said carbonyl compound predominantly as a solution in the solvent, and (3) controlling the rate of generation of said cobalt carbonyl compound and the feed thereof to said carbonylation reaction by keeping the $H_2:CO$ ratio in the generation stage at about 12:88.

References Cited in the file of this patent

UNITED STATES PATENTS

| | | |
|---|---|---|
| 2,504,682 | Harlan | Apr. 18, 1950 |
| 2,725,401 | Mertzweiller et al. | Nov. 29, 1955 |